May 20, 1930.   R. A. DAWES   1,759,041
EYE SHADE
Filed Sept. 29, 1928
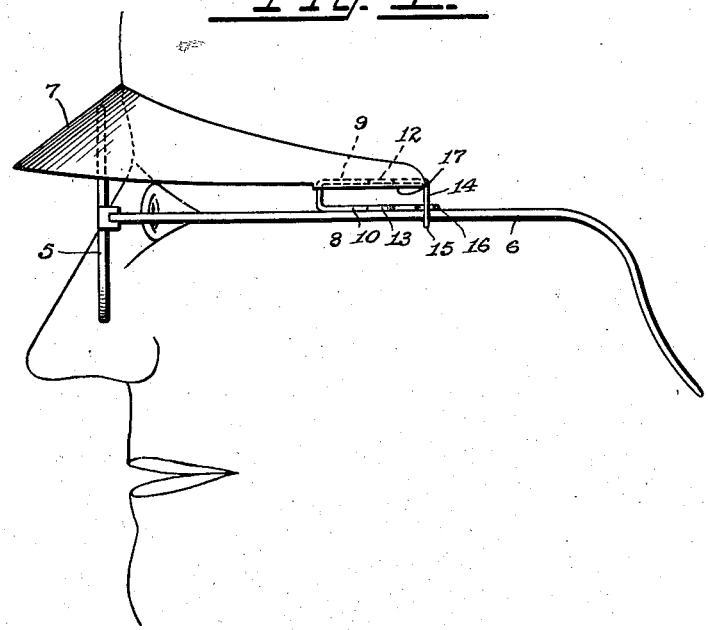
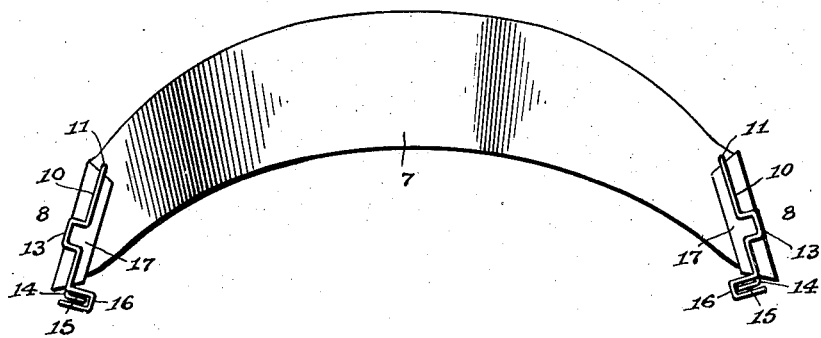
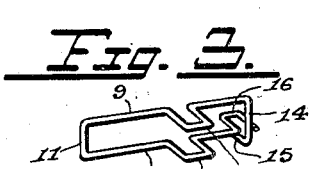
Inventor
Roy A. Dawes.
By John W. Maupin.
Attorney Patented May 20, 1930

1,759,041

UNITED STATES PATENT OFFICE

ROY A. DAWES, OF SEATTLE, WASHINGTON

EYE SHADE

Application filed September 29, 1928. Serial No. 309,236.

My invention relates to eye shades and certain objects of the invention are to provide an eye shade adapted for persons wearing eye-glasses and which has novel spring clips secured to its end portions whereby the shade may be readily donned by securing the clips to the temple members of the eye-glasses with the visor or shade member resting on the rims thereof. The device may be readily removed by a slight pressure on the spring clips to release their hold on the temple members.

The particular advantages in my eye shade are that it is self adjusting; it may be made very small and give efficient results by reason of the fact that it is worn close down over the eyes; it is convenient to carry; it is simple of construction and may be manufactured at comparatively small cost.

With the above and other objects and advantages in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in side elevation showing the device mounted on a pair of eye-glasses;

Fig. 2 is a bottom plan view; and

Fig. 3 is a view in perspective of one of the spring clips.

Referring to the drawings throughout which like reference numerals designate like parts and more particularly to Fig. 1, the numeral 5 indicates the rims of a pair of eye-glasses having temple members 6. When the eye shade is positioned on the wearer its visor or shade member 7 rests on the upper portions of said rims and fits snugly against the brow. The outer ends of the visor are each provided with a spring clip designated as a whole by the numeral 8 which engage the temple members and hold the device securely in place.

The clips 8 are preferably made of spring wire and comprise complementary upper portions 9 and lower portions 10 which are disposed in spaced relation by a connecting portion 11. Said upper portions are provided with right angular offsets 12 and the lower portions have corresponding offsets 13. The outer or free ends of the upper portions are bent downwardly at 14 and inwardly to form tongues 15 at their extreme ends, while the outer ends of the lower portions are bent to form right angular mouths 16 as clearly shown in the drawings.

Referring to Fig. 2 of the drawings, the clips 8 are secured to the ends of the visor 7 by folding said ends at 17, inserting the upper portions 9 of said clips in said folds, and fastening same by the use of adhesive or other securing means. Thus the clips will be held securely and will be prevented from turning in the folded portions by their right angular offsets 12 as will be understood.

To install my eye shade the visor is positioned against the brow of the wearer in such position as to rest on the rims of the eye-glasses as shown in Fig. 1 and the clips 8 are secured by pressing them inwardly with the tongues 15 bearing against the undersides of the temple members 6 and with the mouths 16 bearing against the upper sides of said temple members. The spring clips will hold said temple members in compression between their mouths and tongues and thus retain the device securely in place. It will here be noted that the device is self adjusting for the reason that the spring clips will grasp the temple members at points determined by the size of the wearer's head. To remove the device it is merely necessary to press together the upper and lower portions 9 and 10 with the thumbs and forefingers against the rectangular offsets 12 and 13 sufficiently to release the spring hold on the temple members as will be readily understood.

When not in use the device normally assumes a flat arrangement as shown in Fig. 2 for the reason that it is made of resilient material such as celluloid or the like, and being quite small the device may be carried in the pocket or other convenient place about the person of the wearer. In view of its small size and structural simplicity it may be manufactured at comparatively small cost.

Having thus described my invention, it being understood that minor changes may be resorted to in its construction and particularly in the formation of the spring clips without departing from the scope and spirit of the invention, what I claim and desire to secure by Letters Patent of the United States is:—

The combination with a pair of eye-glasses, of an eye shade comprising a relatively small visor arranged to rest on the rims of the eye-glasses, a spring clip for each end of said visor comprising complementary upper and lower spaced portions, each of said portions having an angular offset, the ends of the visor adhesively secured around said upper portions whereby the angular offsets provide rigid connections, said lower portions having angular mouths at their ends, and tongues formed from the ends of the upper portions arranged to cooperate with said mouths in yieldingly grasping the temple members of the eye-glasses.

In witness whereof, I hereunto subscribe my name this 24th day of September, A. D. 1928.

ROY A. DAWES.